(12) United States Patent
Yau

(10) Patent No.: US 7,719,989 B2
(45) Date of Patent: May 18, 2010

(54) ROUTING PROTOCOL FOR AD HOC NETWORKS

(75) Inventor: Po-Wah Yau, Surrey (GB)

(73) Assignee: Royal Holloway and Bedford New College, Egham (GB)

( * ) Notice: Subject to any disclaimer, the term of this patent is extended or adjusted under 35 U.S.C. 154(b) by 1011 days.

(21) Appl. No.: 10/897,631

(22) Filed: Jul. 23, 2004

(65) Prior Publication Data
US 2005/0030921 A1 Feb. 10, 2005

(30) Foreign Application Priority Data
Jul. 25, 2003 (GB) ................... 0317372.1

(51) Int. Cl.
*G01R 31/08* (2006.01)
(52) U.S. Cl. ...................................... 370/248
(58) Field of Classification Search ................ 370/236, 370/221–224, 241, 248, 312, 348, 249, 310, 370/395.2, 395.52; 455/455, 7, 11.1, 15, 455/41.2, 50, 73
See application file for complete search history.

(56) References Cited

U.S. PATENT DOCUMENTS

| | | | | |
|---|---|---|---|---|
| 5,519,699 A * | 5/1996 | Ohsawa | ....................... | 370/231 |
| 5,732,086 A * | 3/1998 | Liang et al. | .................. | 370/410 |
| 5,917,425 A * | 6/1999 | Crimmins et al. | ...... | 340/825.49 |
| 7,103,371 B1 * | 9/2006 | Liu | ........................... | 455/456.4 |
| 2002/0129295 A1 * | 9/2002 | Nishioka et al. | ................ | 714/4 |
| 2002/0145978 A1 * | 10/2002 | Batsell et al. | ................ | 370/238 |
| 2003/0163729 A1 * | 8/2003 | Buchegger | ................... | 713/201 |
| 2003/0202476 A1 * | 10/2003 | Billhartz et al. | ............. | 370/236 |
| 2003/0217140 A1 * | 11/2003 | Burbeck et al. | ............. | 709/224 |
| 2004/0095932 A1 * | 5/2004 | Astarabadi et al. | .......... | 370/389 |

(Continued)

FOREIGN PATENT DOCUMENTS

EP 0 817 074 B1 1/1998

(Continued)

OTHER PUBLICATIONS

Broch, J. et al., *A Performance Comparison of Multi-Hop Wireless Ad Hoc Networking Protocols*, Computer Science Department, Carnegie Mellon University, Pittsburgh, PA 15213, Oct. 25, 1998, pp. 1-13.

*Primary Examiner*—Kwang B Yao
*Assistant Examiner*—Kenan Cehic
(74) *Attorney, Agent, or Firm*—Leydig, Voit & Mayer, Ltd.

(57) ABSTRACT

A routing method for an ad hoc network is disclosed, the network comprising two or more nodes (A, B, C, D, E, F), and the method comprising: sending a message from a start node (A) to a finish node (F) via one or more intermediate nodes (B, C, D, E); each of the start node (A) and intermediate nodes (B, C, D, E) receiving an acknowledgement signal (AckB, AckC, AckD, AckE, AckF) from a one-hop neighboring node when the one-hop neighboring node receives the message from the start node (A;F) or intermediate nodes (B, C, D, E) and, in the case of the one-hop neighboring node not being the finish node (F), the start node and intermediate nodes receiving an acknowledgement signal (AckC, AckD, AckE, AckF) from a two-hop neighboring node when the two-hop neighboring node receives the message from the one-hop neighboring node.

15 Claims, 3 Drawing Sheets

U.S. PATENT DOCUMENTS

| | | | |
|---|---|---|---|
| 2004/0143647 A1* | 7/2004 | Cherkasova | 709/219 |
| 2004/0153520 A1* | 8/2004 | Rune et al. | 709/206 |
| 2005/0013253 A1* | 1/2005 | Lindskog et al. | 370/238 |
| 2005/0226195 A1* | 10/2005 | Paris et al. | 370/338 |
| 2005/0243765 A1* | 11/2005 | Schrader et al. | 370/328 |
| 2006/0183421 A1* | 8/2006 | Proctor et al. | 455/11.1 |

FOREIGN PATENT DOCUMENTS

| WO | WO 01/69862 A3 | 9/2001 |
|---|---|---|
| WO | WO 02/096039 A1 | 11/2002 |

* cited by examiner

ROUTING PROTOCOL FOR AD HOC NETWORKS

FIELD OF THE INVENTION

This invention relates to a routing protocol for an ad hoc network. In particular, it relates to a secure routing protocol for mobile ad hoc networks.

BACKGROUND OF THE INVENTION

Mobile ad hoc networks are a class of networks based on wireless technologies. Ad hoc networks are a permanent or temporary collection of nodes that can communicate with each other. A "node" is a device with a network interface that is participating in routing in the mobile ad hoc network. A node can be a large network (eg, a Local Area Network (LAN)) or a single device. Examples of devices that can act as nodes include mobile phones, laptop computers and personal digital assistants (PDAs). For a wireless network each node will have a transmitter and receiver so that each node can communicate with neighbouring nodes. The advent of accessible and compact short range communication systems such as the Bluetooth™ system means it is now feasible that a wide range of devices can be configured to behave as nodes.

Ad-hoc networks have no pre-existing infrastructure and there is no central entity to provide network administration services. Each mobile node operates as a router, forwarding packets for other mobile nodes in the network that may not be within direct wireless transmission range of each other. End-to-end communication may require the routing of information via several intermediate nodes.

Ad hoc networks are sometimes referred to as multi-hop networks, where a hop is a direct link between two nodes. If wireless communication is being used then two nodes are within one hop of each other if they lie within each other's transmission range.

Ad hoc networks may find use, for example, for emergency services coordinating their efforts, business associates sharing information during a meeting, and students using laptop computers to participate in an interactive lecture.

Routing protocols used in ad hoc networks can normally be classed as either "proactive", "reactive" or "hybrid". Proactive routing relies on flooding the whole network with route update information. These update transmissions occur periodically, for example, every 5 seconds. Proactive routing schemes are used for Internet communication. As much of the update information is the same from one update to the next, conventional proactive routing is seen to be too resource intensive for use in ad hoc networks.

In reactive routing schemes a node will only try to locate another node when it is necessary. This avoids wastage of resources but increases delays in the routing.

Hybrid routing protocols have been developed. An example of a hybrid protocol is the Zone Routing Protocol (ZRP). In ZRP, proactive routing is performed locally, and reactive routing is used to discover routes outside of the proactive routing zone. Each node maintains route information for all the nodes within the routing zone.

The following terms are used in this document, but may be used differently elsewhere. An "originator node" is a node which originates a data packet, intended for a certain "destination node". A node is a "neighbour node" of another node if it is only one hop away, ie within direct transmission range. Likewise, a "2-hop neighbour node" is a node which is two hops away. If the destination node is not a neighbour node of the originator node, the data packet will have to traverse a multi-hop route consisting of "intermediate nodes". In a specific scenario, the "sending node" is the last node to send the data packet. A "friendly" node is one which is willing and able to forward packets. A "routing message" is any packet used by the routing protocol to affect routing information.

It is desirable to know, when a packet of information has been sent to an intermediate node, whether the packet has been received and forwarded by that node. FIG. 1 schematically illustrates a passive acknowledgement system. For illustrative purposes only three nodes are shown, A, B and C. Node A sends a packet of information to node B which then sends the packet onto node C. When node B transmits the packet to node C the transmission is generally isotropic, that is the message is transmitted with approximately equal strength in all directions. Therefore, when B transmits to C then A will also receive that transmission. In this way A will have confirmation that the packet has been forwarded by B.

A problem with passive acknowledgement is that the signal that B transmits may not reach A due to collisions or other interference.

Mobility introduces a major design constraint not present in wired networks, namely the need for energy efficiency. The consequence of this is that network services must be efficient, and must also take account of nodes which do not have enough energy to participate. An example of where this can give rise to a security threat is provided by the routing service in the network. Routing is a distributed operation in ad hoc networks, where every node can act as a router. Failed nodes are defined as those nodes which do not have enough resources to generate or forward data packets, and such nodes may often occur through battery exhaustion.

However, there is a related class of threats to routing arising from 'selfish nodes'. These nodes try to exploit the routing protocol to their own advantage. Selfish nodes are nodes that have the ability to forward information packets but do not do so. The primary motivation for their unhelpful behaviour is to enhance their own performance and to save their own energy resources. In ad hoc networks, the main threat from such nodes comes from the selfish dropping of packets, which can severely affect the performance of the network. Selfish nodes may also attempt to gain a better quality of service by reserving routes and bandwidth by not responding to routing messages. The key difference between failed and selfish nodes is that selfish nodes have the ability and resources to forward packets, whereas failed nodes do not.

Another class of threats is from badly failed nodes. A badly failed node functions in the network but transmits incorrect information. Malfunctioning equipment or software bugs may cause badly failed nodes. A further class of threats is from malicious nodes. A malicious mode also sends out wrong information, but this is done deliberately to disrupt the network.

Failed, badly failed, selfish and malicious nodes are all classes of "unfriendly nodes".

Awerbuch et al. attempt to address the problems of failed and selfish nodes. (B. Awerbuch, D. Holmer, C. Nita-Rotaru, and H. Rubens. "An on demand secure routing protocol resilient to Byzantine failures", in D. Maughan and N. Vaidya, editors, Proceedings of the ACM Workshop on Wireless Security, Sep. 28, 2002, Atlanta, Ga., USA, pages 21-30. ACM Press, 2002).

The Awerbuch mechanism uses explicit acknowledgements; however, in this scheme, the originator node is responsible for maintaining the status of the route. When the originator node has not received an acknowledgement for a data packet, the originator node has to perform a binary search on the route using a system of probes to try and discover which link is broken. The link which is believed to be broken is weighted negatively. A link management system is used to calculate routes, so route calculations involving broken links will produce negative results so that they are not used.

Yang et al. also attempt to address the problems of failed and selfish nodes (H. Yang, X. Meng, and S. Lu, "Self-organized network-layer security in mobile ad hoc networks", in D. Maughan and N. Vaidya, editors, Proceedings of the ACM Workshop on Wireless Security, Sep. 28, 2002, Atlanta, Ga., USA, pages 11-20. ACM Press, 2002). Yang uses passive acknowledgements, and the identities of nodes which have been detected as misbehaving are broadcast to the rest of the network. This collaborative approach uses tokens to grant access to network services.

There has been much work on generic mechanisms designed to work with any routing protocol. Previously proposed schemes by Marti et al. (S. Marti, T. J. Giuli, K. Lai, and M. Baker, "Mitigating routing misbehavior in mobile ad hoc networks", in R. Pickholtz, S. Das, R. Caceres, and J. J. Garcia-Luna-Aceves, editors, Proceedings of the Sixth Annual International Conference on Mobile Computing and Networking, August 6-11, 2000, Boston, Mass., USA, pages 255-265. ACM Press, 2000.), and Buttyan and Hubeaux (L. Buttyan and J. Hubaux. Stimulating cooperation in self-organising mobile ad hoc networks. ACM/Kluwer Mobile Networks and Applications (MONET), 8(5), October 2003, to appear) attempt to mitigate the effect of selfish nodes using a currency model, where nodes are given "virtual money" which they must use in order to request a service such as forwarding a data packet, ie they "pay" a node to perform a service and that node can then use the "money" to pay for services itself. Recently more research has been conducted on distributed reputation mechanisms by (1. S. Buchegger and J.-Y. Le Boudec, "Performance analysis of the CONFIDANT protocol (cooperation of nodes: Fairness in dynamic ad-hoc networks)", in J. Hubaux, J. J. Garcia-Luna-Aceves, and D. Johnson, editors, Proceedings of The Third ACM International Symposium on Mobile Ad Hoc Networking and Computing, 9-11 Jun., 2002, Lausanne, Switzerland, pages 226-236. ACM Press, 2002; and 2. P. Michiardi and R. Molva, "CORE: A collaborative reputation mechanism to enforce node cooperation in mobile ad hoc networks, in B. Jerman-Blazic and T. Klobucar, editors, Communications and Multimedia Security, IFIP TC6/TC11 Sixth Joint Working Conference on Communications and Multimedia Security, Sep. 26-27, 2002, Portoroz, Slovenia, volume 228 of IFIP Conference Proceedings, pages 107-121, Kluwer Academic, 2002. A major problem with reputation mechanisms of this type is that they suppose that past behaviour is indicative of future behaviour. This allows a malicious node to build a good reputation, until an opportunity arises for when the malicious node can inflict maximum damage for a long period of time.

Also, current distributed solutions rely too much on a "promiscuous" mode, which can be unreliable in certain situations. For example, if node A were to transmit a packet for node B to forward to node C, node B may have to move out of node A's transmission range in order to do so. In a promiscuous based mechanism, unless node A moves along with node B, it would receive no acknowledgement that node B forwarded the packet to node C. There are also fundamental problems with collisions, where node A does not hear node B forwarding a packet for it, as another node D has also began transmission which prevents the signal from node B reaching node A. Observation in promiscuous modes is difficult due to different frequencies and spread spectrum technologies. Therefore, each node will have to waste a lot of resources monitoring all frequencies. These are some of several flaws with current data link layer protocols and promiscuous observation.

Distributed reputation operations also need a high number of messages to detect misbehaviour, and this increases the amount of time needed to react appropriately. The extra number of messages exchanged are now vulnerable to many of the same attacks on routing messages. In addition, other new attacks exist such as spoofing positive or negative reputation messages.

SUMMARY OF THE INVENTION

According to a first aspect of the invention there is provided a routing method for an ad hoc network, the network comprising two or more nodes, the method comprising sending a message from a start node to a finish node via one or more intermediate nodes forming an ad hoc path of communication through the network; the start node receiving an acknowledgement signal from a one-hop neighbouring node when the one-hop neighbouring node receives the message from the start node, and the start node receiving an acknowledgement signal from a two-hop neighbouring node when the two-hop neighbouring node receives the message from said one-hop neighbouring node; the or each intermediate node in the path of communication, in turn, receiving an acknowledgement signal from a respective one-hop neighbouring node downstream of it in said path when the respective one-hop neighbouring node receives the message from the respective intermediate node upstream in said path and, except in the case of the one-hop neighbouring node being the finish node, each intermediate node receiving an acknowledgement signal from a respective two-hop neighbouring node, which is downstream of it in said path, when the two-hop neighbouring node receives the message from the one-hop neighbouring node which is upstream said two-hop neighbouring node in said path.

According to a second aspect of the invention there is provided an ad hoc network comprising a start node, a finish node and one or more intermediate nodes, the nodes being configured to send a message from the start node to the finish node via the intermediate nodes, wherein each of the start node and intermediate nodes is configured to receive an acknowledgement signal from a one-hop neighbouring node when the one-hop neighbouring node receives the message from a respective one of the start node and intermediate nodes and, in the case of the one-hop neighbouring node not being the finish node, each of the start node and intermediate nodes being configured to receive an acknowledgement signal from a respective two-hop neighbouring node when the two-hop neighbouring node receives the message from the respective one-hop neighbouring node.

According to a third aspect of the invention there is provided a node configured to receive an acknowledgement signal from a one-hop neighbouring node when the one-hop neighbouring node receives the message from said node and said node being configured to receive an acknowledgement signal from a two-hop neighbouring node when the two-hop neighbouring node receives the message from the one-hop neighbouring node.

According to a fourth aspect of the invention there is provided software encoded in a machine-readable medium for implementing the method of the first aspect of the invention, or the operation of a node according to the third aspect of the invention.

The acknowledgment sent back from the 2-hop neighbouring node to the 0-hop node confirms that it received the message from the 1-hop neighbouring node. This acknowledgment is used to prove that the 1-hop neighbouring node did receive and forward the message.

This can enable the detection of selfish nodes so that the network can react appropriately.

This can also provide for the detection of failed nodes and to exclude them, so that they are not used whilst they are failed. Failed nodes are of no use for routing, but the method can support their ability to recharge and come back online.

Preferably each node broadcasts a beacon message periodically to its 1-hop neighbouring node to indicate that it is still present and operational.

Preferably, each node has a routing table including a set of addresses for its one-hop and two-hop neighbouring nodes.

Preferably the routing table includes one or more reputation values, the or each reputation value representing how much a respective neighbouring node has been cooperating in the routing of messages.

Preferably the routing table includes one beacon value per entry indicating the length of time since a beacon message has not been received from that neighbour.

Preferably the routing table includes a retry value indicating the number of times the node should resend the message to a 1-hop neighbouring node that has not responded with an acknowledgment signal.

Preferably the retry value for a 1-hop neighbouring node is determined from the reputation value of the 1-hop neighbouring node.

Preferably, each message sent by a node is accompanied by a digital signature.

Preferably, each acknowledgement signal sent by a node is accompanied by a digital signature.

Digital signatures provide non-repudiation so that the signing node cannot deny sending the message, and origin authentication so that a node can always be sure that it has received a packet from the claimed source.

In an embodiment of the invention the message is a data packet.

In an embodiment of the invention the message is a route request.

In an embodiment of the invention the message is a route reply.

DESCRIPTION OF EMBODIMENTS OF THE INVENTION

Embodiments of the invention will now be described by way of example only, with reference to the accompanying drawings, of which:

Figure 1:
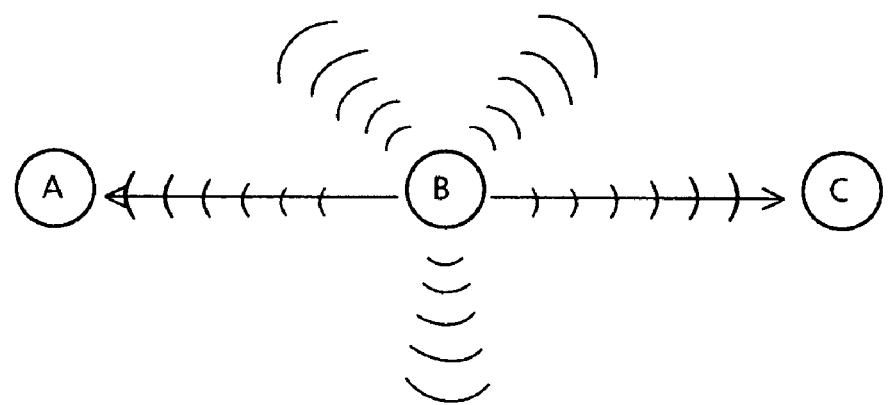
FIG. 1 is a schematic illustration of a passive acknowledgement system.

A system will now be described in relation to a 2-hop acknowledged routing protocol. However, it should be appreciated that the invention is not limited to the use of acknowledgement signals from nodes that are two hops away, and the invention can be applied to the use of acknowledgement signals that are further than two hops away.

The system is based on the Zone Routing Protocol (ZRP). If the flood is restricted to just the local neighbourhood, then much of the benefit of proactive routing is kept, without the inefficiencies of a network-wide flood.

This presents a hybrid ad hoc routing protocol which uses a 2-hop acknowledgement mechanism to detect both failed and selfish nodes. The protocol is hybrid as it uses both proactive and reactive mechanisms. In particular, each node proactively maintains a topological view of all nodes which are two hops away. When a node requires a route to a destination node not within two hops, a reactive route discovery mechanism is used.

The maintenance by each node of the proactive topological view of its 2-hop neighbourhood works as follows. When a node, defined to be the 0-hop node, sends any data or routing packets, the routing protocol requires a 2-hop neighbour to send an acknowledgement back to the 0-hop node, confirming that it received the packet from the 1-hop neighbour node. This acknowledgement is used to prove that the 1-hop neighbour did receive and forward the packet. The acknowledgement can then be used as part of a simple reputation mechanism (discussed later).

1 Important Issues

In an adversarial environment it is assumed every neighbour node is potentially failed or selfish, eg a multi-domain ad hoc network where nodes do not trust each other. The current protocol will be described in an adversarial environment.

In order to describe the routing protocol more easily, each node will be treated as if it has only one network interface operating, and therefore has only one identifiable address.

The use of a single identifier implicitly reveals another important assumption. We suppose that each node cannot connect to the network using a false identifier, or masquerade as another node, ie the ownership of an address is trusted. This may require peer-to-peer entity authentication in the underlying data-link layer.

Each node has the capability to digitally sign each packet it sends and also verify the signatures of each of the other nodes in the network. This might, for example, be achieved by equipping each node with a public key certificate signed by a common certification authority, and exchanging certificates in the Neighbourhood Solicitation and Advertisement messages (see below). Digital signatures provide non-repudiation so that the signing node cannot deny sending the message, and origin authentication so that a node can always be sure that it has received a data packet from the claimed source. This is used to enhance the security techniques in the protocol. Digital signatures can also provide data integrity. The specific details of these authentication mechanisms are well known to the person skilled in the art.

One further assumption related to digital signatures is that each node will have a private/public key pair. For the moment, we assume that a public key is bound to only one node. Key distribution and management are briefly discussed later.

Before describing how the protocol works, the data and packet structures used in protocol are defined.

2.1 Data Structures

A Routing Table is maintained by every node. This routing table contains an entry for each neighbour node—Table 1 lists the contents of an entry. An Acknowledgement Table is also maintained to record details of any sent packets for which the node is waiting for an acknowledgement. It also serves as a record to detect duplicate packets. The Acknowledgement Table contains an entry for each such packet—Table 2 lists the contents of one entry.

TABLE 1

Contents of a Routing Table Entry

| | |
|---|---|
| Neighbour address | The unique address for a neighbour node. |
| Neighbour public key | The verified public key of the neighbour node. |
| The neighbour set | The set of addresses and verified public keys of the 2-hop neighbours associated with the neighbour. |
| Known destination | A list of reachable nodes using that neighbour as a next hop. This may initially be empty. |

TABLE 1-continued

Contents of a Routing Table Entry

| | |
|---|---|
| Lifetime | The expiry time for the entry, after which it should be deleted. |
| Beacons | The number of consecutive update periods for which no Beacon message has been received. See below for information about Beacon messages. |
| Reputation value | This value represents how much a neighbour has been cooperating. |
| Number of retries | This is the number of times a node should resend a packet to a neighbour which has not responded with an appropriate acknowledgement. |

TABLE 2

Contents of an Acknowledgement Table Entry

| | |
|---|---|
| Packet type | The type of message - a Route Request, Route Reply, or data packet. |
| Destination | The destination address of the packet. |
| Unique sequence number | This is the unique sequence number from the packet which was sent or received. |
| Digital signature | The digital signature from the packet. |

2.2 Packet Structures

Every packet is prefixed with a header before it is transmitted. The packet header consists of the following fields:

Source address The address of the originator node.

Sending address The address of the node from which the packet was received.

Destination address The address of the destination node of the data packet.

Unique sequence number A unique sequence number generated by the originator node.

Time-to-live This is the maximum number of hops the packet can traverse. It is decremented every time the packet is forwarded. All messages in the Neighbour Sensing Protocol (see below) have an initial Time-to-live value of 1.

Retransmit This is set to a value of 1 if the originator node wants to allow the packet to be rerouted along an alternative route. If not this field is set to 0. This field is only used for data packets, so it is also set to 0 for all route control messages.

Digital signature A signature on the whole data packet, including the header generated by the originator. All routing messages, with the exception of the Neighbour Solicitation message, must be digitally signed by the node originating the message. Any packet without a valid digital signature is silently dropped.

2.3 Protocol Parameters

Variable parameters are used in various places in the protocol, and these are indicated in an italic font. Simulations and/or practical experimentation for particular situations can determine the initial and optimum values for these variable parameters. While these parameters could take global values, they will more likely be locally adjusted to meet individual requirements. For example, a group of stationary nodes are less likely to need to send frequent route control messages, so this can be reflected in the parameter values they choose to use.

3 Protocol Overview

The routing protocol is divided into three phases. The first is a proactive Neighbour Sensing Protocol which allows nodes to discover who is in their 2-hop neighbourhood. The second phase is the Route Discovery Cycle, used to discover new routes when they are needed. Finally, the third phase involves sending data packets using the discovered routes.

3.1 The Neighbour Sensing Protocol

Table 3 contains a list of the message types used in the Neighbour Sensing Protocol. All messages in the Neighbour Sensing Protocol are sent with a time-to-live value of one, so they are not forwarded any further. When a new node enters the network, it broadcasts a Neighbour Solicitation message. Of the new node's 1-hop neighbours, those who are able to reply should send a Neighbour Advertisement message (after a random z seconds to prevent a reply storm where every node tries to send a message at the same time, so the transmissions cause collisions and therefore no successful transmission occurs). The Neighbour Advertisement message states the sender's address and the addresses of its set of friendly neighbours.

TABLE 3

The messages used in the Neighbour Sensing Protocol

| | |
|---|---|
| Neighbour Solicitation | This is used by a node which has just come online and wishes to participate in the network. |
| Neighbour Advertisement | This is sent in response to a Neighbour Solicitation message. A Neighbour Advertisement message contains a list of friendly 1-hop neighbour nodes. |
| Beacon | This is a message which is periodically broadcast by a node to its 1-hop neighbours to indicate that it is still present and operational. |
| Neighbourhood Update | This message is sent instead of a Beacon message when a node detects that its 1-hop neighbourhood has changed. Thus, a Neighbourhood Update message contains a list of new nodes which have appeared, and old nodes which are no longer friendly neighbours. |

Thereafter, every node broadcasts a Beacon message after every period of update seconds. Each node also periodically checks its Routing Table to delete any expired entries, ie entries for nodes from which no Beacon or Neighbourhood Update messages have been received in the last b update periods. A node will only accept a new neighbour as friendly after it has received c Beacon messages within a window of d update periods. The Neighbour Solicitation message also counts as a Beacon message in this case.

If a node notices that its 1-hop neighbourhood has changed, eg by receiving new Neighbour Solicitation messages or deleting expired entries, it will broadcast a Neighbourhood Update message instead of a Beacon message at the next update interval. When a node receives a Neighbourhood Update message, it checks its Routing Table to see if it needs to update any entries using the new information.

3.2 The Route Discovery Cycle

Table 4 contains descriptions of each message used in the Route Discovery Cycle. When a node requires a route to a destination not present in its Routing Table, it originates and broadcasts a Route Request message.

TABLE 4

The messages used in the Neighbour Sensing Protocol

| | |
|---|---|
| Route Request | This message is generated and sent when a node needs a route to a destination for which no route exists in the node's Routing Table. The Route Request contains the originating node's address and the requested destination node's address, |

TABLE 4-continued

The messages used in the Neighbour Sensing Protocol

| | |
|---|---|
| | together with a Route ID, taken from a counter maintained by the node. |
| Route Reply | This message is generated and sent in response to a Route Request message by the node which is the requested destination. The Route Reply message contains the originator node's address, which is used to route the message, and the unique sequence number from the corresponding Route Request. |
| Request Acknowledgement | This message is generated and sent in response to a Route Request message if the node is not the destination node. The Request Acknowledgement message contains the address of the node the acknowledgement is intended for, a list of neighbour nodes to which the Route Request will be forwarded, the unique sequence number, and the digital signature from the original Route Request. This signature can then be used by the 0-hop and 1-hop node to verify that the Request Acknowledgement is valid, by comparing it to the signature from the matching Route Request. |
| Reply Acknowledgement | This message is generated in response to a Route Reply message, to acknowledge that it has been received and that it will be forwarded. The Reply Acknowledgement message contains the address of the node the acknowledgement is intended for, the unique sequence number, and the digital signature from the original Route Reply. This signature can then be used by the 0-hop and 1-hop node to verify that the Reply Acknowledgement is valid, by comparing it to the signature from the matching Route Reply. |

A node does not process a Route Request if it is either received from an unfriendly neighbour, if it is received from a neighbour it has just broadcast the Route Request to (i.e. a duplicate Route Request), or if the requested destination is an unfriendly neighbour. After a Route Request message has been sent, all the 1-hop neighbours who have enough power (and who do not ignore it for the reasons given in the previous sentence) reply with a Request Acknowledgement message. This message will contain a list of 2-hop neighbours who will be able to propagate the Route Request further. Thus, a 2-hop node will only be included if it has neighbour nodes to which it can forward the request. The 1-hop neighbour can compile the list because it will know the identities of some of the originating node's 3-hop neighbours.

If a node does not receive a Request Acknowledgement message within time t, it may resend the Route Request up to a maximum of s times. It is important that the node performs an exponential backoff by doubling the value of t every time it sends a route request. The receipt of a duplicate Route Request is indication that the neighbour node did not receive the Request Acknowledgement, so a 1-hop will know it will have to rebroadcast the acknowledgement.

Once the 1-hop neighbour nodes have replied with a Request Acknowledgement message, they can then send the Route Request to all the 2-hop neighbour nodes which were listed in the Request Acknowledgement. Again, the 2-hop nodes will perform their own checks before accepting the Route Request. The 1-hop node will receive in reply either a Route Reply or a Request Acknowledgement message. The 1-hop neighbour must forward these back to the 0-hop node. These messages act as an acknowledgment that the 1-hop neighbour is not failed or selfish. See section 3.4 for more information about how this information is subsequently used. Only the destination of the Route Request can generate a Route Reply, which is propagated back towards the originator node. In response to a Route Reply, a node will have to generate and send a Reply Acknowledgement to the 1-hop neighbour from which the Route Reply was received.

If the 1-hop neighbour did not receive a Route Reply, this process is repeated, moving along one hop for each cycle, until the Route Request reaches the requested destination node. This node then produces a Route Reply which is propagated back to the originator node in the same way that the Route Request was propagated to the destination node, except that Reply Acknowledgement messages are used instead of Request Acknowledgement messages. Another way of describing the Route Discovery Cycle, is that if a 1-hop neighbour does not have the destination node in its own 2-hop neighbourhood, it becomes the 0-hop node of a Route Request on behalf of the originator node, and so on.

The use of the Route ID enables a node to accept the same Route Request or Route Reply from different neighbours, thus enabling multiple routes for the same destination to be discovered and acknowledged.

Figure 2:
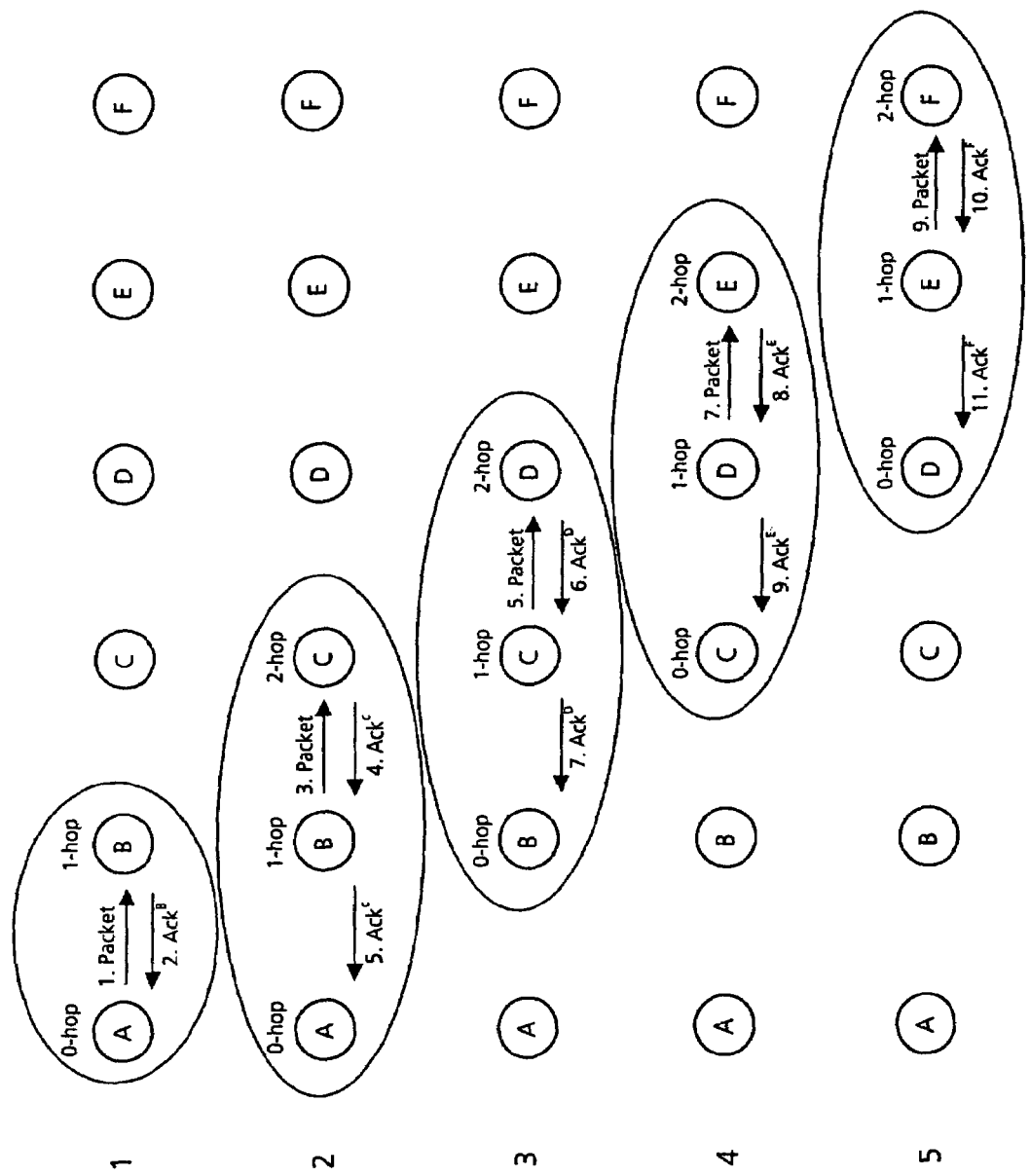
FIG. 2 is a schematic illustration of the stages of a two-hop acknowledgement system.
Figure 3:
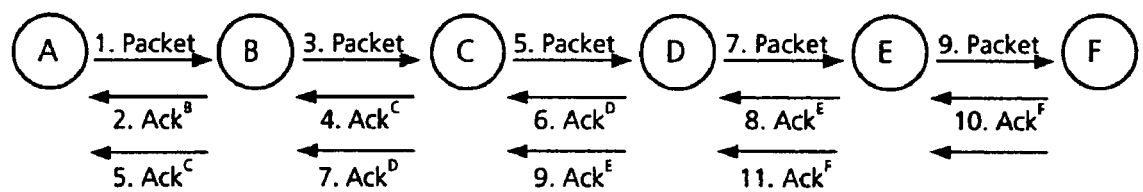
FIG. 3 is a schematic illustration of a two-hop acknowledgement system.

FIG. 2 schematically illustrates each stage, that is each two-hop zone for the communication of a message between nodes. FIG. 3 schematically illustrates how the two-hop zones of FIG. 2 link together. In FIGS. 2 and 3 a Route Request, Route Reply or data packet has been sent by node A, destined for node F, where all nodes know the route to send packets for node F. All nodes must respond with a signed acknowledgement ($Ack_x$) where x is the node which signed the message. Each message is prefixed with a number to demonstrate the order in which the messages will be sent.

Note that, to prevent a route looping back on itself, a node only processes a Route Request for the same destination as a previously received Route Request, if it contains a higher Route ID than previously recorded in the Acknowledgement Table, or a Request with the same Route ID has been received from a neighbour to which the node has not previously sent a Route Request.

3.2.1 Forward and Reverse Path Set-Up

A "forward and reverse path set-up" mechanism is used in the protocol. This mechanism is also used in the Ad Hoc On-demand Distance Vector (AODV) routing protocol (AODV is a protocol known to the person skilled in the art), is also used here. In this mechanism, when a node receives a Route Request message from a friendly neighbour, it can use the information in the Route Request to record an entry in its Routing Table pointing to the originator node, that is, the neighbour from whom the Route Request message was received is recorded as the next hop towards the originator node. The first Route Request received is used to form the default route. All subsequent valid Route Requests are used to form alternative routes to the same destination.

The same procedure is applied when receiving Route Reply messages, ie to identify the next-hop neighbour node to whom packets intended for the destination node should be sent.

3.3 Sending Data Packets

Two messages are used in connection with the routing of data packets (see table 5).

TABLE 5

Two messages used to assist in sending data

| | |
|---|---|
| Packet Received | This message is an acknowledgement generated when a 1-hop or 2-hop neighbour receives a data packet for forwarding. Acknowledgements from 2-hop nodes are sent back to the originator node via the 1-hop neighbour from |

TABLE 5-continued

Two messages used to assist in sending data

| | |
|---|---|
| | whom the data packet was received. The Packet Received message contains the address of the node the acknowledgement is intended for, the unique sequence number from the header of the data packet, and a digital signature on the received data packet. |
| Route Error | This message is an indication that the data packet has not reached its intended destination node. The message contains the destination address, unique sequence number, and the digital signature from the original data packet which triggered the Route Error. This signature can then be used by recipients of the Route Error message to verify that it is valid, by comparing it to the signature from the matching data packet. |

Data packets are sent in a similar way to Route Requests. When a node has a data packet to send to a destination it parses its Routing Table. The originator node is the 0-hop node. Where the destination is a 1-hop node, the 0-hop node can send the data packet directly to the 1-hop node. Nodes perform various checks on receiving data packets, to ensure that old or replayed packets are not forwarded, but are dropped, to decrease unwanted traffic on the network. If the data packet is new, the node checks its time to live. If this is zero or less the data packet should not have been forwarded, and it is dropped. If the data packet is not from a friendly neighbour, as defined in the Routing Table, it may also be dropped. It will also be dropped if the originator node for the packet is not recorded as a destination node in the Routing Table. This is because, if the node has received the packet for forwarding, it must have been part of the route discovery cycle, or the packet was originated by a 1 or 2-hop neighbour, and all of these will be in the Routing Table. However, if the data packet is from a 'friendly' node, the 1-hop node has to send a 'Packet Received' message back to the originator node.

When the destination is further than 1 hop away, if the 0-hop node discovers that the destination node is listed in the 'Known Destination' field in one of the 1-hop entries, the 0-hop node can send the data packet to that 1-hop neighbour. When the 1-hop node receives the data packet, it will verify that it was received from a friendly node. If the packet was received from a friendly neighbour, the 1-hop node will forward the packet to a friendly 2-hop node according to its Routing Table. The 1-hop node then generates a Packet Received message and sends it to the 0-hop node from whom the data packet was received.

Upon successfully receiving the data packet from a friendly node, the 2-hop node sends a Packet Received message to the 1-hop node from which it received the packet from, before sending the packet to the next hop node according to its Routing Table, if the 2-hop node is not the destination itself. The 1-hop node forwards the Packet Received message to the 0-hop node. The Packet Received message is an acknowledgement for the 0-hop node, that the 1-hop node sent the data packet and that the 2-hop node received the data packet. The 0-hop node can check the digital signature contained in the Packet Received message, to verify that it was signed by the 2-hop node.

This process now iterates as with route discovery, so that the 1-hop neighbour node now becomes the 0-hop node, waiting for a Packet Received message from its 1-hop and 2-hop nodes (which will be nodes two and three hops away from the 0-hop node respectively). Then the next neighbour node becomes the 0-hop node and so forth, until the data packet reaches the destination node (see FIGS. 2 and 3).

3.3.1 Route Maintenance

Once a node has received a data packet with a specific (originator node destination node) pair, it should always use the same route for all traffic between these two nodes. If a node receives a packet and discovers that the default route has broken (ie its link with the 1-hop neighbour node no longer exists), the node can use an alternative route if it exists, only on condition that the Retransmit flag in the data packet header is set to a value of 1. A packet can only be rerouted once by a node, so if the originator node resends the packet it will not be rerouted on subsequent occasions.

If either the Retransmit flag is 0 or the node does not have an alternative route, the node must inform the originator node of packet delivery failure if the originator node is more than two hops away. To achieve this, the node generates a Route Error message, and routes it back towards the originator of the data packet. Each node which receives the Route Error should check that the information it contains corresponds to a data packet that it has recently transmitted, where Route Error messages are silently dropped if the information does not match. Note that a Route Error message also acts as a Packet Received acknowledgement, so that a node's neighbour will not mark it as selfish. If an intermediate node with multiple routes receives a Route Error for an alternative path, then there is no need to forward the Route Error and the node can update its routing table accordingly. However, if the Route Error is for the default path then the node must forward the Route Error onwards towards the originator node. The originator node decides how it responds to a Route Error message, ie whether it wants to initiate another Route Discovery Cycle for the unreachable destination, resend the data packet with a Retransmit option to see if the data packet can be routed along an alternative route at the link break, or simply return a transmission error to the upper layer application which originated the packet.

3.4 Coping with Selfishness

The following is a simple reputation mechanism for use with the current protocol. Again italicised text is used to indicate a variable parameter. A node that requests its neighbour to send a Route Request message, Route Reply message or data packet, will give the 1-hop neighbour node *retry* opportunities to do so before it will refuse to send packets for its neighbour, ie mark the node as unfriendly. The initial value of *retry* is taken from the 'Number of Retries' field of the Routing Table, and its minimum value is 1. The 'Number of Retries' field is based on a 'Reputation Value' field, so a node can decide on the retry value for a neighbour based on its reputation value. A reputation value is a value given to a node to indicate how reliable the node is, the higher the reputation value the higher the perception of the reliableness of the node.

After a node sends a Route Request, Route Reply or data packet, it waits for a period of time, defined by *retry_interval*, for a matching acknowledgement message from the 2-hop neighbour nodes via which the routing message or data packet is routed. If no acknowledgment has been received, the node tries to send the packet again for *retry* times. After each failed transmission, the value of *retry* is decreased by *decreaseretry*. If *retry* becomes less than zero then the node should decrease the unresponsive 1-hop neighbour's reputation value by *decreaserep*. Thus the node will eventually mark an unresponsive 1-hop neighbour node as 'unfriendly', ie the Reputation Value of the 1-hop neighbour node will be less than zero.

When no acknowledgements have been missed by a 1-hop neighbour for the past y consecutive messages sent, the node should increase the 1-hop nodes' retry value by *increaseretry*. After a certain number (i) of messages, the retry value may be reset to the original value in the 'Number of Retries' field and the 1-hop node's 'Reputation Value' should be increased by increaserep. Resetting the retry value makes it more difficult for a malicious node to build up a good reputation to enable it to behave selfishly without being excluded for a sustained period.

Negative behaviour should have a greater effect than positive behaviour, so the values of increaseretry and increaserep should be less than the values of decreaseretry and decreaserep. This allows the protocol to detect negative behaviour more quickly than if the retry value and the reputation value was just decremented.

In order to take into account the possibility that a non-responding node may be a failed rather than a selfish node, the node will wait an amount of time k before giving the excluded neighbour another opportunity, eg by setting retry=1, if it has packets to route through the unfriendly node. The value of k should also be doubled every time the node tries to send another packet which needs acknowledgement. Thus failed nodes, and even 'repentant' selfish nodes, are permitted to become involved in routing again should they overcome their previous problem with forwarding packets. The period of time k is doubled every time so that resources are not repeatedly wasted testing a node which is still failed or selfish. Thus it is important that the Routing Table entry for an unfriendly 1-hop node is not immediately deleted.

If a node has more than one route to a destination, then it should try each alternative route when the default route fails if retransmission is allowed, while still implementing the reputation mechanism outlined above for each alternative 1-hop node.

4.1 Protocol Performance

In the Route Discovery Cycle bandwidth and resources will be wasted by nodes which perform the Route Discovery Cycle but are not involved in the route. Location information could be a useful tool in enhancing the efficiency of the Route Discovery Cycle.

Another modification would be to enable intermediate nodes to reply to Route Requests, where currently only the destination node can reply. The effect of intermediate nodes replying could increase the efficiency of the Route Discovery cycle immensely, depending on the size of the ad hoc network. However, as there would be no security association between an intermediate and originator node, there is no way to guarantee that the intermediate node is not sending false Route Replies, when it does not have a route to the requested destination node.

The current protocol is based on a localised proactive scheme. Maintaining an up-to-date view of just a 2-hop neighbourhood should not be unnecessarily resource intensive, as the maximum number of neighbours is relatively low. Consequently the number of messages exchanged within a 2-hop neighbourhood will also be small, especially as messages used by the Neighbour Sensing Protocol are only exchanged between 1-hop neighbour nodes.

4.2 Detecting Failed and Selfish Nodes

A main design criterion for the current protocol is that it should detect and prevent selfish behaviour in a reliable way. Without a proactive scheme the 2-hop acknowledgement mechanism would fail. A 0-hop node will need to know who its 2-hop neighbours are, in order to know from whom to expect 2-hop acknowledgements.

The digital signature mechanism has been included to provide origin authenticity. Origin authentication for packets could also, in principle, be provided using Message Authentication Codes. However, in practice this would not be efficient, since potentially packet origin needs to be verified by many different nodes, including authenticity nodes. The digital signing process can be made more robust through the use of unique sequence numbers. These allow every data packet to be unique, so that every digital signature will be different. The primary use of unique sequence numbers is to provide protection against replay attacks. They can also be used to further decrease the likelihood of a successful masquerade attack, like the RAND value used in GSM authentication (RAND is the random number used as the challenge in a challenge-response authentication mechanism). Thus good management of sequence numbers in the protocol ensures that a node's sequence numbers monotonically and randomly increase. This additional complexity will help to discourage potential masquerade attacks. Another threat arises where the 1-hop node is friendly, but the 2-hop node is selfish. Thus, the 0-hop node will receive an acknowledgement from the 1-hop node, but not the 2-hop node. This should not be possible in the protocol, as the 1-hop node should detect that the 2-hop node is selfish from its own communications with the 2-hop node, which would be removed from its list of friendly nodes. This would then be communicated with a Neighbourhood Update message. However, there is a small possibility that a 1-hop node does not know that a 2-hop node is selfish if, for example, it has never asked the 2-hop node to forward any packets. In the case where a 0-hop node sends a packet for forwarding, and the 1-hop node only has one 2-hop neighbour to whom to forward the packet, the 2-hop will be marked as unfriendly by the 1-hop node, and the 1-hop node will be labelled as unfriendly by the 0-hop node. This has different consequences for each of the parties involved. The 0-hop node will gain from the situation, as it knows it cannot use that 1-hop node to send packets to the destination. However, the 1-hop and 2-hop nodes' communication within the network will be severely restricted while they are marked as unfriendly, unless they have other friendly neighbours to communicate with.

It would be disadvantageous for a selfish node to not advertise unfriendly or expired neighbours, as another neighbour could route through the selfish node and still expect acknowledgements from the non-cooperating or non-existent 2-hop neighbours.

4.3 Reacting to Failed and Selfish Nodes

The ideal situation would be a protocol where ad hoc nodes could trade energy for every data packet forwarded. There would then be no motivation for selfish behaviour, and failed nodes may also be of little consequence. However, the technology to achieve this does not exist.

A problem with untrusted, multi-domain ad hoc networks is that one node cannot control how a message is sent by another node; it is only possible to gain assurance that it has been sent. In the current protocol, this assurance is gained through the receipt of 2-hop acknowledgement messages.

Preventing the participation of selfish nodes is a local access control mechanism, where failed and selfish nodes are marked as unfriendly and are therefore unauthorised to participate. By preventing selfish nodes from sending data packets, the protocol tries to change their objective from saving power to exchanging information, the essence of networking. A node marked as unfriendly cannot send Route Requests, Replies or data packets, and thus cannot be the target of any Route Requests. However, the protocol allows data packets to be sent to a selfish node. The reasoning behind this is to cater for the possibility of failed nodes, which may not have enough power to send packets, but may still receive packets.

Ideally, the protocol would not even allow information to reach selfish nodes but, to achieve this, the protocol would need a mechanism which could discover a neighbour node's energy levels in a secure way. This would prevent a selfish node pretending that it does not have enough energy to forward packets.

Failed nodes which cannot forward packets are of no use in ad hoc networks. Hence, the protocol detects them and stops other nodes from using them, to allow failed nodes to recover without the additional burden of having to deal with Route Requests, etc.

5 Security Analysis

This section presents a threat analysis of the protocol, in the context of the other two threat classes in the threat model, namely badly failed and malicious nodes. Badly failed nodes can introduce false routing messages, which are still correctly formatted, but contain false information. The threat of false routing messages can also come from malicious nodes, which have the aim of deliberately disrupting the correct operation of the routing protocol, denying network services if possible. Each subsection below describes the threats arising from such nodes to the three main components of the protocol.

5.1 The Neighbour Sensing Protocol

Any false routing messages sent in the Neighbour Sensing Protocol will cause nodes to waste resources, and misdirect traffic by setting up false routes. In the current protocol, a 2-hop neighbourhood with false neighbours would lead to incorrect next-hops being recorded in the Route Discovery Cycle. However, the current protocol differs to other routing protocols in that false information will be confined to a 2-hop neighbourhood, preventing its spread throughout the whole network. As the Routing Tables are periodically updated using fresh information, any false route information only remains during the period in which a node is sending false routing messages.

An attack similar to the selfish refusal to send Neighbour Advertisements, as mentioned in section 4.2 above, is where a malicious neighbour sends false Neighbour Advertisement messages to a new node, with a list of non-existent 2-hop neighbours. The use of the digital signature mechanism means that, in order to maintain the pretence of the non-existent 2-hop neighbour nodes, the malicious 1-hop neighbour would have to generate private/public key pairs for each of those 2-hop neighbour nodes. Then the malicious neighbour would have to respond to any Route Requests, Replies and data packets with the appropriate acknowledgements, signing each message with the appropriate private key associated with a non-existent 2-hop node. This will be computationally expensive and will therefore use up a significant amount of resource, maybe even more so than the 1-hop nodes that the malicious node is trying to attack.

The Neighbour Sensing Protocol uses explicit beacons rather than relying on the implicit receipt of other routing messages. This prevents a simple attack where a malicious node replays an old data packet, so that the recipients will believe that the data packet is from a new neighbour node, if the data packet contains a source address the node does not have recorded.

Beacon messages are only trusted if they have been received several times within a certain number of update periods. This, along with the requirement for digital signatures, helps to mitigate the effect of false Beacon messages. This mechanism also helps to alleviate the realisation of malicious threats such as wormhole attacks. In the 'Wormhole' attack, a malicious node receives data packets and tunnels them to another part of the network. Thus the success of tunnelling Beacon messages will depend on the length of the update period, where the malicious node would have to continuously tunnel the same Beacon messages from the same node.

Another threat exists where a badly failed or malicious node could send false Neighbourhood Update messages, with a list of new but nonexistent nodes. The effect is similar to that of sending false Neighbour Advertisements. False Neighbourhood Update messages can also be sent containing a list of nodes which are to be removed from Routing Tables. To protect against false Neighbourhood Update messages, one could assume that if a node is behaving badly or maliciously then a node would not want to use it as a next-hop anyway.

Finally, Neighbour Solicitation messages could be sent by a malicious node using a false source address, to masquerade as another node. This could be addressed if the public keys of each node are securely bound to their address.

5.2 The Route Discovery Cycle

When the Neighbour Sensing Protocol is operating correctly, a malicious node will not be able to masquerade as another node and send false routing messages, unless it has access to the private signing key of the node it is trying to impersonate. This is particularly important as it prevents a malicious node from replying to Route Requests with false Route Replies.

A node which refuses to reply to a Route Request or Route Reply with an acknowledgement message is classed as a selfish node and is dealt with according to the protocol.

In route discovery, wormhole attacks are mitigated by a combination of the proactive Neighbour Sensing Protocol, and the 2-hop restriction. Packets are only processed when they have been received from friendly nodes. Thus the success of a wormhole attack relies on whether the malicious node has enough resources to attack the Neighbour Sensing Protocol as described above, in addition to tunnelling the routing message to the same destination.

5.3 Sending Data Packets

A badly failed or malicious node can send spurious data packets as a denial of service attack, causing nodes to waste resources as they process the packets.

Again, a malicious node will not be able to masquerade and send false data packets unless it has access to the private key of the node it is trying to impersonate. This is important as it prevents a malicious node sending Packet Received messages on behalf of a node which has failed.

A malicious node could send a Route Error message in response to a data packet it receives. This will force the originator of the corresponding data packet to believe that delivery to the destination has not been possible. The current protocol does not prevent this but again, a node may not wish to send packets along a route involving a malicious node. The current protocol limits the influence of this attack because a malicious node needs a current data packet in order to generate a valid Route Error message. Thus the malicious node has to be involved in the route of the data packet.

5.4 The Reputation Mechanism

Apart from the threats and attacks described above, there would appear to be little that a badly failed or malicious node can do at the routing protocol level to affect one node's assessment of another node's reputation. The reputation mechanism is not a distributed operation but is maintained locally, which makes attacking it more difficult. Malicious nodes could, however, attack the lower layers of the protocol stack, eg by actively blocking acknowledgement messages to prevent them from reaching their intended recipient. This would cause a node to incorrectly believe a neighbour node is unfriendly. The location of any protection mechanisms to address this threat should be in the lower layers.

6 Implementation

The current protocol could be implemented either in dedicated hardware or software. However, there are potential concerns arising from the need to implement of digital signatures in software in mobile devices, due to the amount of computational power needed.

The computational complexity of signature operations can be significantly reduced by using techniques such as elliptic curve signature schemes, for example EC-DSA as standardised in ISO/IEC 14888-3, or the NTRU signature scheme (these techniques are known to the person skilled in the art). It has been demonstrated that signing using such schemes can be implemented on very computationally limited devices, eg smart cards without a dedicated cryptographic processor. The storage complexity (for public and private keys) can also be reduced by using elliptic curve signature schemes, where keys are quite compact.

Transmission complexity can be significantly reduced by using either elliptic curve schemes (for which signatures are inherently short) or any signature scheme giving (partial) message recovery, eg one of the schemes standardised in ISO/IEC 9796-2 or 9796-3, as used in the EMV industry standard for integrated circuit cards. In the latter case, adding a signature to a message can add as little as 25 bytes to the message length. Similar techniques, again employed in EMV, can be used to make public key certificates only 40-50 bytes longer than the public key.

The current protocol uses a discrete reputation value, where a node can only be friendly or unfriendly. The reputation mechanism could be adjusted so that 'degrees of friendliness' can be calculated.

Broadcasting can be an inefficient way of discovering routes. A large number of nodes will waste resources taking part in the Route Discovery Cycle, when the eventual result is that some nodes will not be involved in the resulting route. Location based services can be used to reduce the number of nodes involved. If the approximate geographical location of the destination node is known, then broadcasting to just a reduced arc will make the Route Discovery Cycle more efficient. Even broadcasting to 180 degree arc provides significant gains in efficiency.

Another optimisation to improve the performance of the protocol is for all nodes to broadcast a warning message when they are moving. This acts as an indication that the local topology could be changing, so a Route Discovery Cycle could be initiated to find alternative routes. Therefore, each node would need to be equipped with a reliable motion sensor.

The current routing protocol may operate in conjunction with other mechanisms, in particular with wireless sensor networks where the emphasis is on organisation of sensed information; in energy constrained routing where metrics based on available energy are more important than other attributes such as shortest path.

The skilled person will appreciate that the mechanisms of the current protocol can be adapted to operate with other protocols such as the Intrazone Routing Protocol (IARP) part of the hybrid Zone Routing Protocol (ZRP).

The invention claimed is:

1. A routing method for an ad hoc network, the network comprising three or more nodes, the method comprising sending a message from a start node to a finish node via one or more intermediate nodes forming an ad hoc path of communication through the network;

the start node receiving an acknowledgement signal from a one-hop neighbouring node generated by the one-hop neighouring node when the one-hop neighbouring node receives the message from the start node, and the start node receiving an acknowledgement signal from a two-hop neighbouring node generated by the two-hop neighbouring node when the two-hop neighbouring node receives the message from said one-hop neighbouring node;

each intermediate node in the path of communication, in turn, receiving an acknowledgement signal generated by a respective one-hop neighbouring node downstream of it in said path, from the respective one-hop neighbouring node when the respective one-hop neighbouring node receives the message from the respective intermediate node upstream in said path and, except in the case of the one-hop neighbouring node being the finish node, each intermediate node receiving an acknowledgement signal from a respective two-hop neighbouring node, generated by the respective two-hop neighbouring node which is downstream of it in said path, when the two-hop neighbouring node receives the message from the one-hop neighbouring node which is upstream of said two-hop neighbouring node in said path;

wherein each acknowledgment signal is generated by its respective sending node and states, by using a digital signature which verifies the respective acknowledgement signal, that the sending node has received the message.

2. The routing method of claim 1, in which the message is a route packet and the start node is the originator node of the route packet and finish node is the destination node of the route packet.

3. The routing method of claim 1, in which the message is a data packet and the start node is the originator node of the data packet and the finish node is the destination node of the data packet.

4. The routing method of claim 1, in which the start node is the destination node of a data packet and the finish node is the originator node of the data packet; and the message is a route reply message indicating that the destination node has received the data packet.

5. An ad hoc network comprising a start node, a finish node and one or more intermediate nodes, the start node, a finish node and one or more intermediate nodes being configured to send a message from the start node to the finish mode via the intermediate nodes, wherein each of the start node and intermediate nodes is configured to receive an acknowledgement signal from a one-hop neighbouring node, and generated by the one-hop neighbouring node, when the one-hop neighbouring node receives the message from a respective one of the start node and intermediate nodes and, in the case of the one-hop neighbouring node not being the finish node, each of the start node and intermediate nodes being configured to receive an acknowledgement signal from a respective two-hop neighbouring node, and generated by the two-hop neighbouring node, when the two-hop neighbouring node receives the message from the respective one-hop neighbouring node, wherein each acknowledgement signal is generated by the node sending the acknowledgment signal and states, by using a digital signature which verifies the respective acknowledgement signal, that the generating node has received the message.

6. A network as claimed in claim 5, in which each node is configured to broadcast a beacon message periodically to its 1-hop neighbouring node to indicate that it is still present and operational.

7. A network as claimed in claim 5, in which each node has a routing table including a set of addresses for its one-hop and two-hop neighbouring nodes.

8. A network as claimed in claim 7, in which the routing table, in use of the network, includes one or more reputation values, the one or each reputation value representing how much a respective neighbouring node has been cooperating in the routing of messages.

9. A network as claimed in claim 7, in which the routing table includes a beacon value indicating the length of time since a beacon message has not been received.

10. A network as claimed in claim 9, in which the routing table includes a retry value indicating the number of times a node should resend the message to a 1-hop neighbouring node that has not responded with a acknowledgement signal.

11. An ad hoc network comprising:
a start node, a finish node and one or more intermediate nodes, the start node, a finish node and one or more intermediate nodes being configured to send a message from the start node to the finish mode via the intermediate nodes, wherein each of the start node and intermediate nodes is configured to receive an acknowledgement signal from a one-hop neighbouring node, and wherein each acknowledgment signal is verified using a digital signature, the acknowledgment signal being generated by the one-hop neighbouring node, when the one-hop neighbouring node receives the message from a respective one of the start node or intermediate nodes and;
in the case of the one-hop neighbouring node not being the finish node, each of the start node and intermediate nodes being configured to receive a second acknowledgement signal from a respective two-hop neighbouring node, the second acknowledgement signal being generated by the two-hop neighbouring node, when the two-hop neighbouring node receives the message from respective one-hop neighbouring node;
in which each node has a routing table including a set of addresses for its one-hop and two-hop neighbouring nodes, wherein the routing table includes a beacon value indicating the length of time since a beacon message has not been received; and
wherein the routing table includes a retry value indicating the number of times a node should resend the message to a 1-hop neighbouring node that has not responded with an acknowledgement signal, wherein the retry value for said 1-hop neighbouring node is determined from the reputation value of the 1-hop neighbouring node.

12. A network as claimed in claim 5, in which each message sent by a node is accompanied by a digital signature.

13. A node for use in an ad hoc network, the node being configured to receive an acknowledgement signal from a one-hop neighbouring node, the acknowledgment signal being generated by the one-hop neighbouring node, when the one-hop neighbouring node receives a message from said node and said node being configured to receive an acknowledgement signal from a two-hop neighbouring node, the acknowledgment signal being generated by the two-hop neighbouring node, when the two-hop neighbouring node receives the message from the one-hop neighbouring node
wherein each acknowledgment signal is generated by its respective sending node and states, by using a digital signature which verifies the respective acknowledgement signal, that the sending node has received the message.

14. A computer readable medium encoded with software for implementing the method of claim 1.

15. A computer readable medium encoded with software for implementing operation of the node according to claim 13.

* * * * *